May 8, 1956  D. ALBERT  2,744,693
ROTATABLE NON-TANGLING FISHING REEL
Filed July 16, 1953
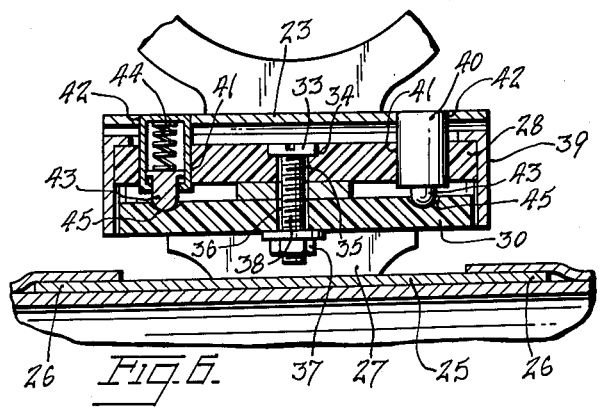
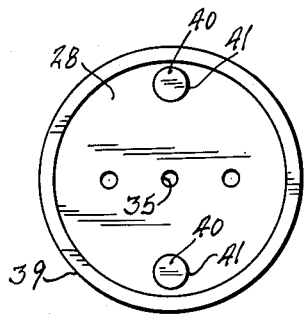
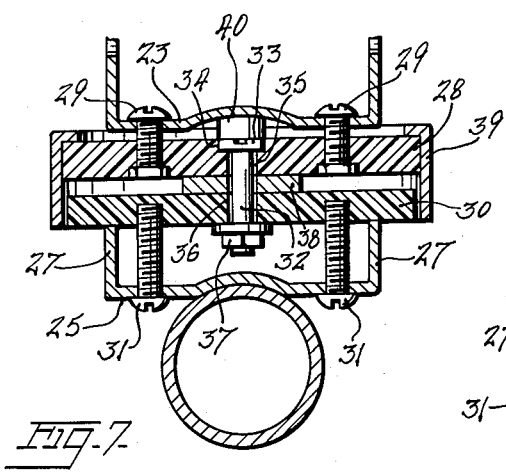
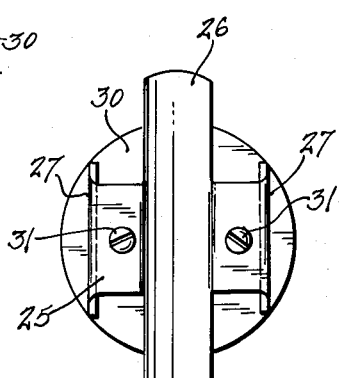
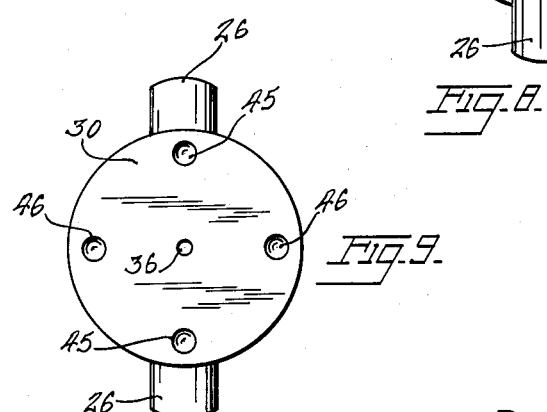
INVENTOR.
DANIEL ALBERT
BY
ATTORNEY

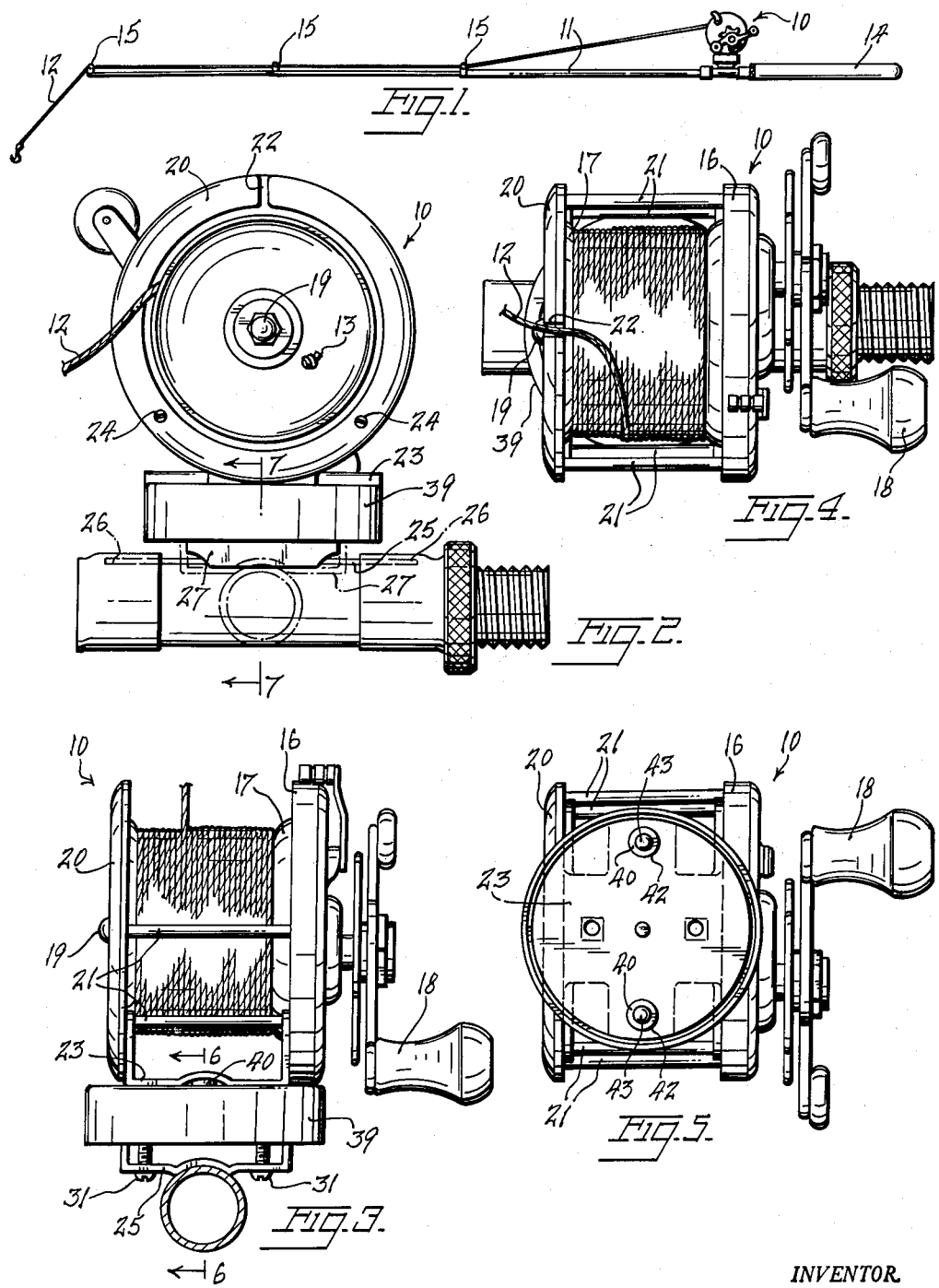

United States Patent Office 2,744,693
Patented May 8, 1956

2,744,693

ROTATABLE NON-TANGLING FISHING REEL

Daniel Albert, Brooklyn, N. Y.

Application July 16, 1953, Serial No. 368,419

1 Claim. (Cl. 242—84.1)

This invention relates to new and useful improvements in fishing or casting reels.

A principal object of the present invention is to provide a fishing reel with means for preventing entanglement and knotting of the line during unwinding and winding operations.

Another object of the invention is to provide a guard for the line which prevents the line from flying out transversely into engagement with the rod thereby obviating entanglement between the line and rod, preventing overrunning of the reel during a casting operation, preventing undesirable backlashing, and affording a longer and more accurate cast.

A further object of the invention is to provide a rotatable reel whereby the reel may be disposed either at right angles or parallel to the fishing pole.

Still another object of the invention is to provide a rotatable reel with means for releasably holding the reel in rotated position.

Yet another object of the invention is to provide a novel reel construction capable of being used by either left-handed or right-handed fishermen.

It is further proposed to construct a fishing reel which is simple and durable and which can be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a side elevational view of the general assembly of a fishing rod and reel embodying my invention.

Fig. 2 is an enlarged end elevational view of the reel of the present invention showing the same in an unwinding or casting position.

Fig. 3 is an enlarged side elevational view of the reel in a rewinding or rereeling position.

Fig. 4 is an enlarged top plan view showing the reel in a line unwinding position.

Fig. 5 is a bottom plan view of the reel with parts omitted.

Fig. 6 is a vertical sectional view taken on the plane of the line 6—6 of Fig. 3.

Fig. 7 is a vertical sectional view taken on the plane of the line 7—7 of Fig. 2.

Fig. 8 is a bottom plan view of the base plate and support for the reel.

Fig. 9 is a top plan view of the parts of Fig. 8.

Fig. 10 is a bottom plan view of the plunger carrying disk plate.

Referring to the drawings in detail, a reel construction 10 is shown in Fig. 1 mounted on a fishing rod 11, the reel construction being movable on the rod between a position with the reel axis transverse to the rod, as illustrated in Fig. 3 of the drawings, and a position with the reel axis parallel to the rod, as illustrated in Fig. 4 of the drawings. In the axis transverse position shown in Fig. 3, the reel construction may be rotated for rewinding or rereeling a fishing line 12 thereon, and in the axis parallel position shown in Fig. 4 of the drawings, the line 12 may be unwound or stripped from the reel, the line being secured to the reel at one end by a knot 13, as shown in Fig. 2. The reel construction is mounted as usual at the handle end 14 of the rod 11 and the rod as usual is provided with line guides 15, as shown in Fig. 1.

The reel construction 10 comprises a reel plate 16 rotatably supporting the spool or reel proper 17 which is rotatable by a handle 18. The spool or reel is secured to the plate 16 by a headed locking screw 19 and is surrounded by a cage formed by a circular member or ring 20 and the circumferentially arranged spacing rods 21. The circular member or ring 20 is provided with a break or slot 22 therein. When the reel is moved to the axis parallel position shown in Fig. 4, the line 12 feeds out or moves through the slot 22 so that the line may be readily stripped or unwound from the reel, and conversely when the reel is moved to the axis transverse position shown in Fig. 3, the line moves back through this slot 22 into the unreeling position. The ring 20 serves as a circular guard confining the line against lateral throw at the reel cage.

According to the invention, a swivel connection is provided between the reel 10 and the fishing rod 11. This connection includes a base plate 23 secured to the spacing rods 21 in the reel cage by screws 24, and a base plate 25 fastened to the rod 11. The base plate 25 is concaved at its bottom to fit the part of the rod to which it is attached, and is provided with oppositely extending wings 26 and side flanges 27. The wings are secured to the rod part by means of straps 27. A disk-shaped plate 28 depends from the plate 23 and is secured thereto by screws 29, and a similar disk-shaped plate 30 is supported on the flanges 27 of the base plate 25 and is secured to the base plate by screws 31. The plate 28 carries a headed swivel bolt 32 having a rectangular-shaped head 33 seated in a similar shaped countersunk recess 34 in the surface of the plate 28 to prevent relative rotation between the plate and bolt. The bolt extends through a central opening 35 in the plate 28 and loosely through a central opening 36 in plate 30 whereby the plate 28 is adapted to swivel on the plate 30 in either a clockwise direction or a counterclockwise direction, as viewed in Fig. 4. A nut 37 on the end of the bolt holds the disk-shaped plates together and a washer 38 on the bolt between said plates keeps them in spaced relation. A flanged ring or band 39 encircles the plates 28 and 30, covering the space therebetween.

Provision is made for yieldingly holding or locking the reel in moved position, that is, in the position of either Fig. 3 or Fig. 4. The plate 28 is provided with diametrically positioned stop devices, each device including a socket 40 mounted in an opening 41 in the plate 28 adjacent its periphery, the closed end of the socket protruding outwardly of the surface of the plate 28 and through an opening 42 in the base plate 23. A plunger 43 slidably fits in the open end of each socket and interposed between the inner end of the plunger and the closed end of the socket is a pressure spring 44 urging the plunger outwardly. The plate 30 is provided with two sets of circular depressions, one set being designated 45 and the other set 46, each set being adapted to register with the spring-pressed protruding plungers. When the reel 10 is moved to axis parallel position, as shown in Fig. 4, the set of depressions 46 are in locking registry, and when the reel is moved to right-angled position, the other set of depressions 45 are in locking registry.

In using the improved fishing rod and reel, when a cast is to be made, the reel is moved to the axis parallel position, as shown in Fig. 4, and the line is cast, passing outwardly under the guard ring 20, as shown in Fig. 4. The ring serves to break the local centrifugal action of the line at the reel and therefore to confine the line to its desired movement preventing the same from becoming entangled with the fishing rod. After a cast is made, the reel is moved to the rewinding position shown in Fig. 3. In this position, it is only necessary to manually insert the line 12 in the slot 22 and then to turn the handle 18 in order to rewind the line, the line passing over one of the spacing rods 21 to its position on the spool, as shown in Fig. 3.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A fishing reel construction comprising a reel body, a base structure therefor and means of swivel connection between the reel body and base structure, said reel body including a circular plate, a spool supported on said circular plate, a cage surrounding said spool including a circular plate spaced from the first-named circular plate, and spacing rods connecting said circular plates, said base structure including a U-shaped plate having extensions disposed transversely to the legs and base of the U for connection to a support, and a disk-shaped plate supported by said U-shaped plate, said disk-shaped plate having a central opening therein, said means of swivel connection including a U-shaped plate secured to the spacing rods, a disk-shaped plate depending from the latter U-shaped plate, said latter disk-shaped plate having an opening aligned with the opening in the first-named disk-shaped plate, a swivel bolt extending loosely through the aligned openings in said disk-shaped plates, and means for holding the reel body in swiveled position including spring-pressed plungers depending from said first-named disk-shaped plate, and cooperating depressions on the opposed surface of the second-named disk-shaped plate.

References Cited in the file of this patent

UNITED STATES PATENTS

| | | |
|---|---|---|
| 1,114,084 | Wells | Oct. 20, 1914 |
| 1,617,543 | Roberts | Feb. 15, 1927 |
| 2,283,773 | Teitsma | May 19, 1942 |
| 2,614,767 | Dean | Oct. 21, 1952 |

FOREIGN PATENTS

| | | |
|---|---|---|
| 816,045 | France | Apr. 19, 1937 |
| 413,843 | Italy | June 7, 1946 |